Nov. 20, 1928.

R. WELSH 1,692,067

GATE VALVE

Filed Aug. 22, 1927

INVENTOR.
Richard Welsh
BY
ATTORNEYS.

Patented Nov. 20, 1928.

1,692,067

UNITED STATES PATENT OFFICE.

RICHARD WELSH, OF LOS ANGELES, CALIFORNIA.

GATE VALVE.

Application filed August 22, 1927. Serial No. 214,672.

My invention relates to gate valves, and more particularly to a construction and arrangement in which I provide a guard for the screw or stem to prevent dirt and grit and other foreign matter from filling up the threads and interfering with the easy manipulation of the valve. At present these screws are exposed and unprotected and there accumulates thereon dirt, grit, oil and grease, and other matter to such an extent that it is almost impossible to operate the valve.

The object of my invention is to provide a special guard for the screw which will shut out all of this dirt and foreign matter without interfering with the use and operation of the valve and at the same time permit of the screw being well lubricated for easy operation.

In order to explain my invention, I have illustrated on the accompanying sheet of drawings one practical embodiment thereof which I will now describe.

Figure 1:
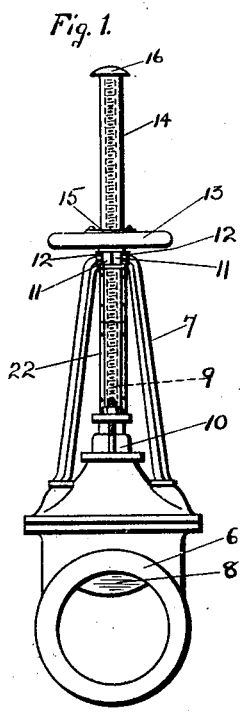
Figure 1 is an end view of a gate valve embodying my invention, showing the valve open, with the screw up in the guard.
Figure 2:
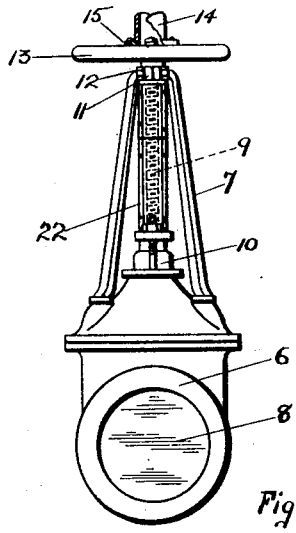
Figure 2 is a similar view, showing the gate closed.

Referring now in detail to the drawings, my invention as here embodied for descriptive purposes comprises a gate valve body 6, with yoke 7, with the valve member 8, therein, with screw 9, extending up through the yoke 7, with the usual packing at 10. The upper end of the yoke 7, is provided with collar portions 11, 11, bolted together with bolts 12, and upon this collar is a screw wheel 13, threaded interiorly of its hub portion to receive the screw stem 9, of the valve member, whereby as said wheel 13, is turned said screw stem is raised through the threaded hub of the wheel until it projects above the yoke, as indicated in Fig. 1, when the gate valve is open.

Figure 4:
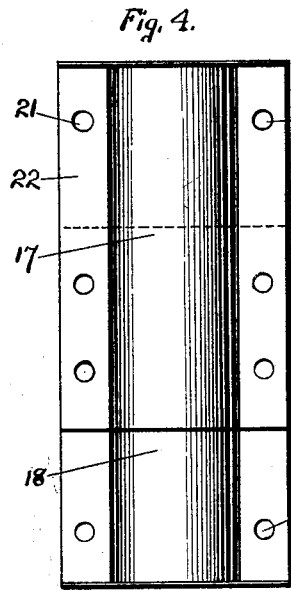
Figure 4 is an elevation of the two portions forming one half of a guard for the lower part of the screw, under the yoke.
Figure 5:
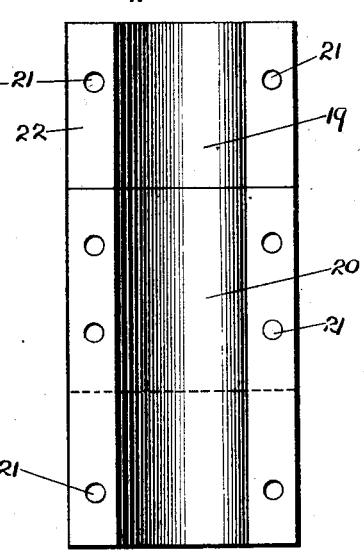
Figure 5 is an elevation of the two portions forming the other half of a guard for the lower part of the screw, under the yoke, and looking into the concaved face thereof.
Figure 3:
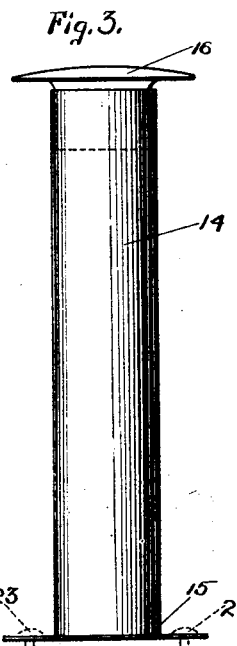
Figure 3 is a view of the upper guard removed from the operating wheel.

Referring now to Fig. 3, I have shown a sleeve 14, provided at its lower end with a flange 15, by means of which it is secured to the hub of the wheel 13, as will be seen in Fig. 1, and into which said screw stem extends as it is raised by the operation of the wheel 13, to open and close said valve. A detachable cap plug 16 is set into the upper end of said sleeve, and this can be removed when it is desired to lubricate the screw. Said screw is covered or protected under the yoke 7 by means of two two-part members adapted to be placed around the screw and secured together. These are shown in Figs. 4 and 5, and comprise two overlapping members 17 and 18, and slidable one upon the other, and two overlapping members 19 and 20, sliding one upon the other for adjustment to the distance between the upper end of the yoke 7 and the top of the packing box at 10. These two two-part members are placed around the screw, within the yoke, and are bolted together by means of small bolts through the holes 21, 21, in the flange portions 22, 22, of said parts, and in a manner which will be easily understood from the drawings.

The shield or guard for the screw within the yoke is large enough to allow the screw to turn freely therein, and is removable at will by simply removing the bolts, and the guard sleeve 14, attached to the top of the screw wheel 13, turns with the wheel as the screw stem 9 rises therein, as will be clear. This is removable or detachable from said screw wheel by removing the screw bolts 23, 23, from the flange thereof, as will be understood.

While I have shown and described one practical embodiment of my invention, I am aware that changes in details can be made therein without departing from the spirit thereof, and I do not limit the invention to these details, except as I may be limited by the hereto appended claims.

I claim:

1. In combination with a gate valve having a valve member and operating screw for moving said valve member, a screw wheel on said operating screw for raising and lowering it to open and close said valve member, of a sleeve guard upon said wheel to receive the end of said screw as it moves through said screw wheel, a cap for said sleeve guard, a yoke supporting said screw wheel in operating position, and guard members around said screw within said yoke, said guard members being separable and adjustable as to length whereby to be applied to said screw, within said yoke to protect said screw from dirt.

2. In combination with a gate valve having a valve member and operating screw, an operating screw wheel on said screw, a yoke supporting said screw wheel, and a guard for said screw within said yoke, said guard comprising two two-part members adapted to embrace said screw and the parts of each being slidable one upon the other to be adjustable as to length, and means for securing said two-part members together around said screw, substantially as described.

Signed at Los Angeles, Los Angeles County, California, this 17th day of August, 1927.

RICHARD WELSH.